(12) United States Patent
Yang et al.

(10) Patent No.: US 11,330,159 B2
(45) Date of Patent: *May 10, 2022

(54) MOBILE DEVICE AND LENS MODULE

(71) Applicant: Samsung Electro-Mechanics Co., Ltd., Suwon-si (KR)

(72) Inventors: Dong Shin Yang, Suwon-si (KR); In Do Seo, Suwon-si (KR); Ju Sung Park, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,266

(22) Filed: Sep. 23, 2020

(65) Prior Publication Data

US 2021/0006696 A1 Jan. 7, 2021

Related U.S. Application Data

(63) Continuation of application No. 16/136,775, filed on Sep. 20, 2018, now Pat. No. 10,834,300.

(30) Foreign Application Priority Data

Dec. 5, 2017 (KR) .................. 10-2017-0165683
Mar. 7, 2018 (KR) .................. 10-2018-0026906

(51) Int. Cl.
*H04N 5/225* (2006.01)
*G06F 1/16* (2006.01)
*G02B 7/02* (2021.01)

(52) U.S. Cl.
CPC ............. *H04N 5/2254* (2013.01); *G02B 7/02* (2013.01); *G06F 1/1686* (2013.01); *H04N 5/2253* (2013.01)

(58) Field of Classification Search
CPC ..................................................... H04N 5/2254
(Continued)

(56) References Cited

U.S. PATENT DOCUMENTS

2006/0067669 A1  3/2006 Moriya
2006/0221469 A1  10/2006 Ye
(Continued)

FOREIGN PATENT DOCUMENTS

CN    1837942 A    9/2006
CN    204359995 U    5/2015
(Continued)

OTHER PUBLICATIONS

Korean Office Action dated Oct. 17, 2019 in corresponding Korean Patent Application No. 10-2018-0026906 p. 1-14 (8 pages in English, 6 pages in Korean).
(Continued)

*Primary Examiner* — Joel W Fosselman
(74) *Attorney, Agent, or Firm* — NSIP Law

(57) ABSTRACT

A mobile device and lens module including a lens barrel and a plurality of lenses sequentially stacked from an object side to an image side in the lens barrel, wherein the plurality of lenses includes one or more D-cut lenses having respective straight line rim portions, and wherein a straight line portion of a D-cut lens, of the one or more D-cut lenses, overlaps an image sensor for imaging light passing through the plurality of lenses.

20 Claims, 10 Drawing Sheets

(58) Field of Classification Search
USPC .......................................................... 348/340
See application file for complete search history.

(56) References Cited

U.S. PATENT DOCUMENTS

| | | |
|---|---|---|
| 2010/0110270 A1 | 5/2010 | Sekimoto et al. |
| 2010/0328789 A1* | 12/2010 | Yen ........................ G02B 7/026 |
| | | 359/822 |
| 2016/0139359 A1 | 5/2016 | Lin et al. |
| 2017/0160511 A1* | 6/2017 | Kim ...................... G02B 13/002 |
| 2017/0235095 A1* | 8/2017 | Sekimoto ............. G02B 27/646 |
| | | 359/824 |
| 2017/0329151 A1 | 11/2017 | Hu et al. |

FOREIGN PATENT DOCUMENTS

| | | |
|---|---|---|
| CN | 107360349 A | 11/2017 |
| JP | 2005-249994 A | 9/2005 |
| JP | 2006-284788 A | 10/2006 |
| JP | 2010-134409 A | 6/2010 |
| JP | 2017-53976 A | 3/2017 |
| KR | 10-0808017 B1 | 2/2008 |
| KR | 10-2017-0065955 A | 6/2017 |

OTHER PUBLICATIONS

Chinese Office Action dated Sep. 2, 2020, counterpart of Chinese Patent Application No. 201811372795.3 (6 pages in English, 7 pages in Chinese).

* cited by examiner

MOBILE DEVICE AND LENS MODULE

CROSS-REFERENCE TO RELATED APPLICATION(S)

This application is a Continuation Application of U.S. patent application Ser. No. 16/136,775 filed Sep. 20, 2018, which claims benefit of priority under 35 USC 119(a) of Korean Patent Application Nos. 10-2017-0165683, filed on Dec. 5, 2017, and 10-2018-0026906, filed on Mar. 7, 2018, in the Korean Intellectual Property Office, the disclosures of which are incorporated herein by reference in their entireties for all purposes.

BACKGROUND

1. Field

The present disclosure relates to a mobile device and lens module.

2. Description or Related Art

Camera modules may be used in personal portable devices such as mobile phones and PDAs. In the camera module, a plurality of lenses are stacked and coupled in a cylindrical barrel along an optical axis, and a lens barrel in a housing and an image sensor in a lower portion of a lens may be coupled. An optical filter may also be coupled with the lens barrel in the lower portion of the lens.

Meanwhile, in typical camera modules, a problem arises that if a fluorescent light or a strong light is incident at a certain angle in a dark or less well lit room, light of a particular angle produces inner surface reflection from a lens rib surface accommodated in the lens barrel.

This inner surface reflection light is light unrelated to image formation, causing a flare or ghost phenomenon in the formed image, i.e., the image sensor picks up the undesirable produced flare or ghost phenomenon.

Therefore, it may be desirable to shield light incident on an image forming surface of the image sensor with respect to inner surface reflections from the lens rib surface.

As a non-limiting example, as mobile devices become smaller and thinner, there may be a desire to reduce the size of the camera module independent or, or in addition to, the desire to improve camera module performance, and, in such a situation, such prevention of the flare and ghost phenomenon may be desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a lens barrel, and a plurality of lenses sequentially stacked from an object side to an image side in the lens barrel, where the plurality of lenses includes one or more D-cut lenses having respective straight line rim portions, and where a straight line portion of a D-cut lens, of the one or more D-cut lenses, overlaps an image sensor for imaging light passing through the plurality of lenses.

The D-cut lens may be disposed closest, among the plurality of lenses, to the image sensor.

The D-cut lens may include a pair of straight line portions on symmetrically opposing sides of the D-cut lens with respect to an optical axis of the plurality of lenses.

The lens barrel may include a notch penetrating through inside and outside of the lens barrel at an end of the image side of the lens barrel.

The lens module may further include the image sensor, where the image sensor has a rectangular shape having a long side and a short side, and the short side is disposed in parallel with the straight line portion of the D-cut lens.

The notch may be provided over both inner and outer portions of a virtual space formed by an extension line connecting an optical axis of the plurality of lenses and the straight line portion of the D-cut lens or both ends of the short side of the image sensor with a shortest distance, where the image sensor may have a rectangular shape having a long side and a short side, and the short side is disposed in parallel with the straight line portion of the D-cut lens. The lens module may further include the image sensor.

The notch may be provided inside a virtual space formed by an extension line connecting an optical axis of the plurality of lenses and the straight line portion of the D-cut lens or both ends of the short side of the image sensor with a shortest distance, where the image sensor has a rectangular shape having a long side and a short side, and the short side is disposed in parallel with the straight line portion of the D-cut lens. The lens module may further include the image sensor.

The notch may be formed to have an angular shape or a round shape.

At least a pair of notches, including the notch, may be symmetrically provided through the lens barrel with respect to an optical axis of the plurality lenses.

The notch may be provided between the D-cut lens and the image sensor in an optical axis direction of the plurality of lenses.

In one general aspect, a mobile device including the lens module may be provided in a bezel region, where a camera module including the lens module may be installed in the bezel region in an upper portion of a display of the mobile device as a front camera of the mobile device, and where the straight line portion or the D-cut portion of the lens module may be mounted to be parallel to a short side of the mobile device.

In one general aspect, a lens module includes a lens barrel, and a plurality of lenses sequentially stacked from an object side to an image side in the lens barrel, where the lens barrel includes a D-cut portion, in a flat cut-out shape on an outer surface of an end portion of the lens barrel in a direction of the image side, and a rounding portion other than the D-cut portion, and where the D-cut portion of the lens barrel is configured to overlap an image sensor for imaging light passing through the plurality of lenses.

A least one of the plurality of lenses provided in the image side may include a straight line rim portion.

The D-cut portion of the lens barrel and the straight line rim portion may be arranged in parallel with each other.

The lens barrel may include a notch penetrating through inside and outside of the lens barrel at an end of the image side of the lens barrel.

The notch may be provided in the D-cut portion of the lens barrel.

The notch may be provided over both the D-cut portion and a portion of the rounding portion of the lens barrel.

The lens module may be a mobile device, and further include a display, wherein the lens module is installed as a front camera of the mobile device along with the display or as a back camera on a side of the mobile device other than a side with the display.

In one general aspect, a lens module includes a lens barrel, and a plurality of lenses sequentially stacked from an object side to an image side in the lens barrel, where the lens barrel includes a notch penetrating through inside and outside of the lens barrel at an end of the image side of the lens barrel, and where the notch is configured to overlap an image sensor for imaging light passing through the plurality of lenses.

A least two notches, including the notch, may be provided at a certain interval along a circumference of the lens barrel.

The lens module may be a mobile device, and further include a display, wherein the lens module is installed as a front camera of the mobile device along with the display or as a back camera on a side of the mobile device other than a side with the display.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
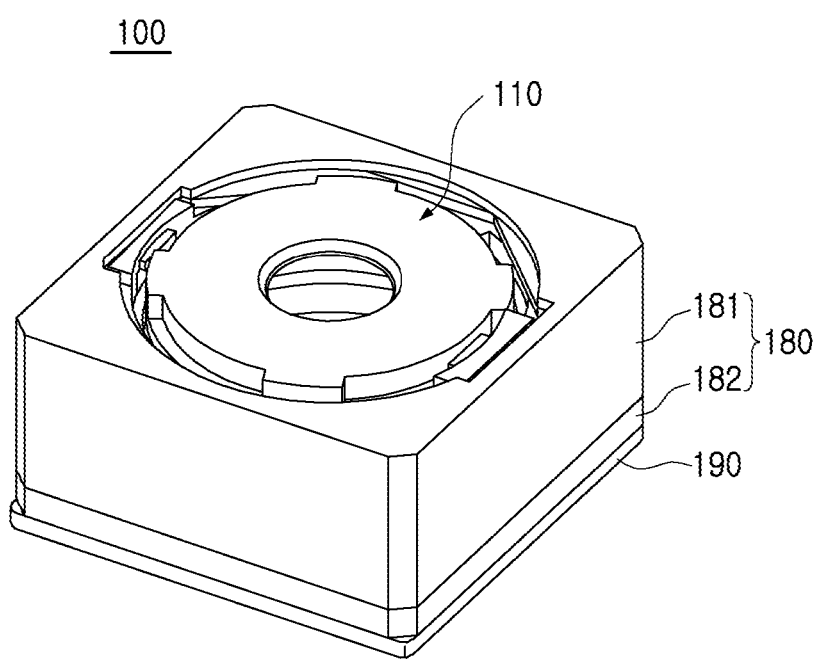
FIG. 1 is an assembled perspective view of a camera module according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
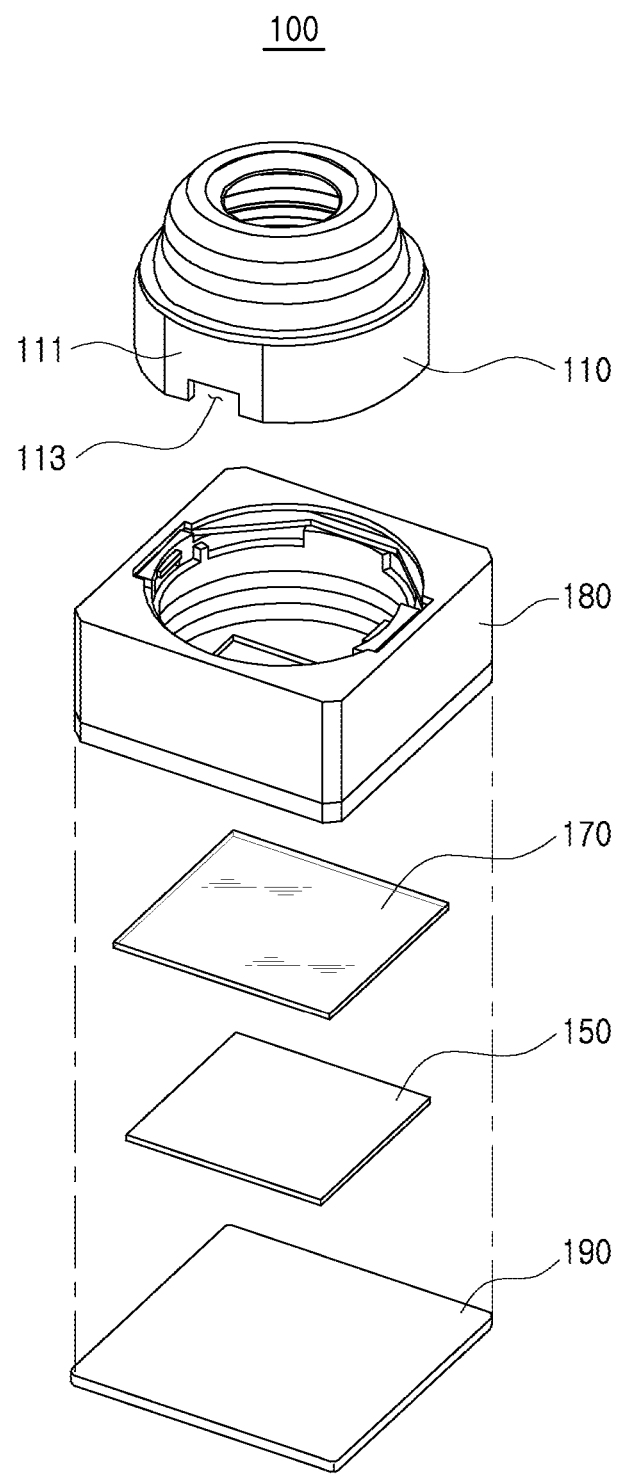
FIG. 2 is an exploded perspective view of a camera module according to one or more embodiments.
Figure 3:
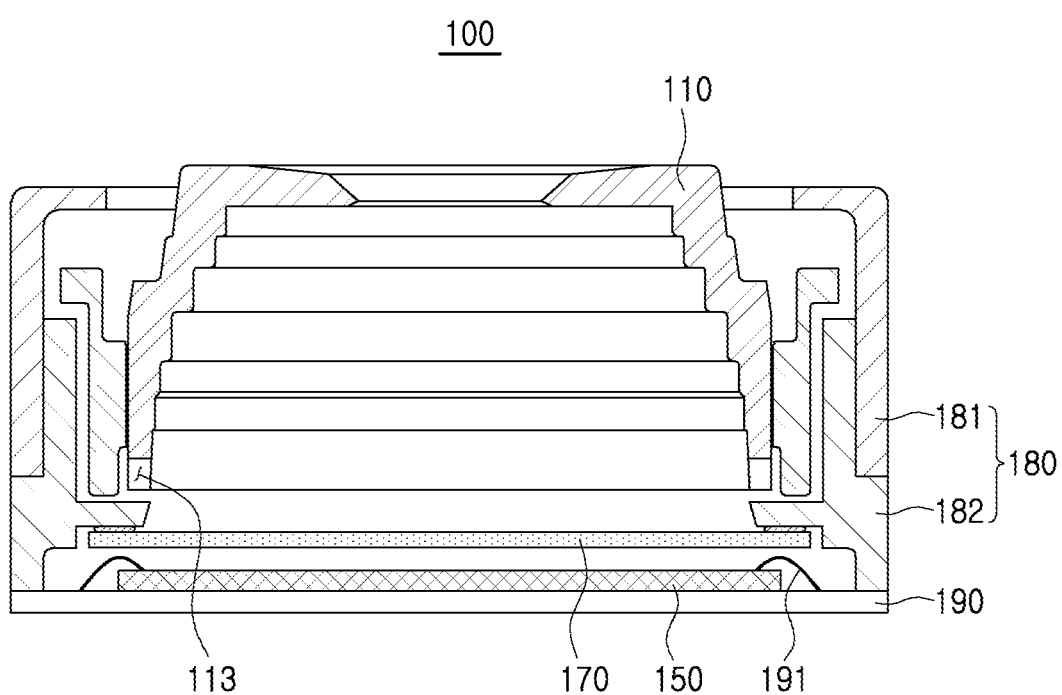
FIG. 3 is a cross-sectional view of a camera module according to one or more embodiments.

Referring to FIGS. 1 through 3, a camera module 100 according to one or more embodiments is disclosed. As shown in FIGS. 1 through 3, the camera module 100 may include a lens barrel 110, a housing 180, an optical filter 170 (e.g., an infrared filter (IR filter), etc.), an image sensor 150, and a circuit board 190, for example.

Inside the lens barrel 110, a plurality of lenses are sequentially stacked from an object side to an image side, and the lens barrel 110 is disposed inside a housing 180. The plurality of lenses may be fixed to the lens barrel 110 by press-fitting or bonding with an adhesive, for example. Alternatively, as another non-limiting example, the plurality of lenses may be fixed by indentation rings that support a last lens in a direction of the image side. Here, a lens module may correspond to at least the lens barrel 110 and the plurality of lenses included in the lens barrel 110, for example, as well as a plurality of spacers, and the like, for example. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, the optical filter 170 fixed to the housing 180 is provided in a lower portion of the lens barrel 110. The example circuit board 190 on which the image sensor 150 is mounted may be coupled or attached to a lower portion of the housing 180. Here, though an optical filter or a circuit board is referenced, the optical filter 170 and the circuit board 190 are respectively representative of one or more optical filters and circuit boards.

For example, with this structure, light incident on an upper portion of the lens barrel 110 passes through a series of lenses, passes through the optical filter 170, and is received by the image sensor 190, where imaging of the incident light thereto may be performed.

Here, the lens barrel 110 may include 'D' shaped D-cut portion(s) 111 in which part(s) of an outer surface are flatly cut in a lower portion of the lens barrel 110 that is closer to the image sensor 150 (i.e., an end of the lens barrel 110 in the image side direction) and rounded portion illustrated as forming the remaining circumferential portions of the lens barrel 110 other than the D-cut portion(s) 111, which may maximize space utilization in some examples. Accordingly, a D-cut lens L6 may be disposed closest to the image sensor 150 since the example D-cut lenses L5 and L6 among the plurality of lenses are disposed to be biased toward the image side of the lens barrel 110.

In an example, unnecessary spaces of the lens barrel 110 may be removed by providing the D-cut portion 111, and thus the camera module 100 may be miniaturized. For example, in an example as discussed below with respect to FIGS. 4-6, some of the rim portions of the lenses may be reduced to be provided to have lesser outer radii portions from the optical axis compared to other rim portions of the respective lenses, and thus a portion of the lens barrel 100 may be provided with reduced D-cut portions corresponding to these lesser total radii portions. Thus, with such reduced provisions of the lens barrel 110, a pair of the D-cut portions 111 of the lens barrel 110 may be provided respectively on symmetrical opposite sides of the lens barrel 110 with respect to the optical axis, noting that examples also include the provision of one or more than two of such D-cut portions 111.

Figure 4:
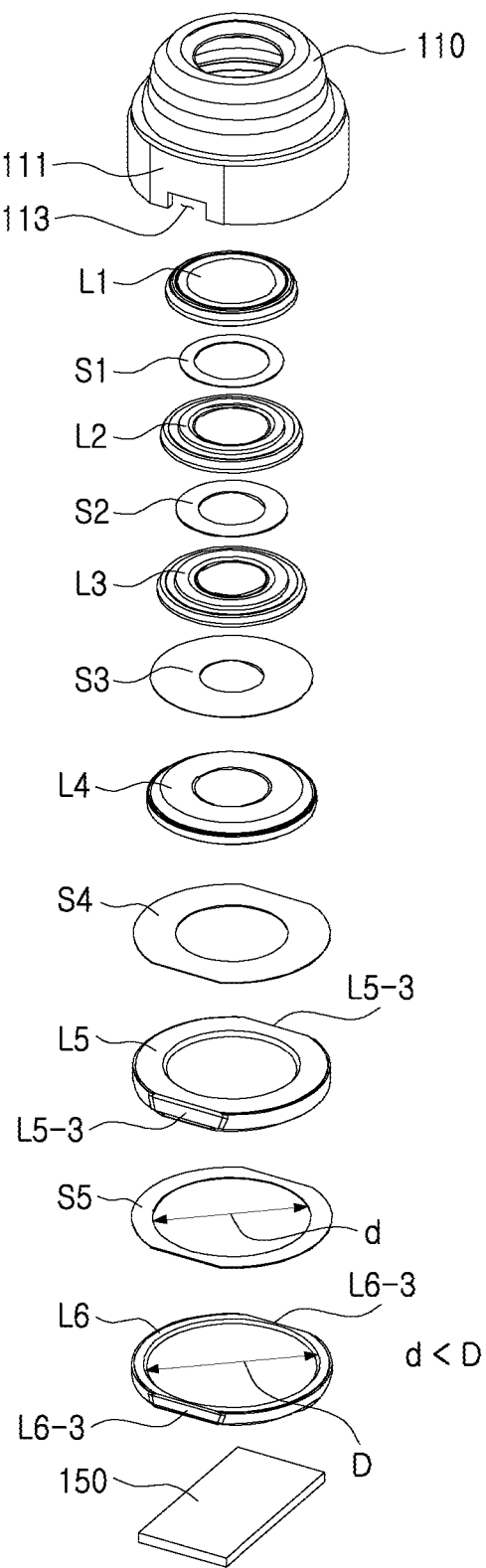
FIG. 4 is an exploded perspective view showing an arrangement relationship of a lens module and an image sensor according to one or more embodiments.
Figure 5:
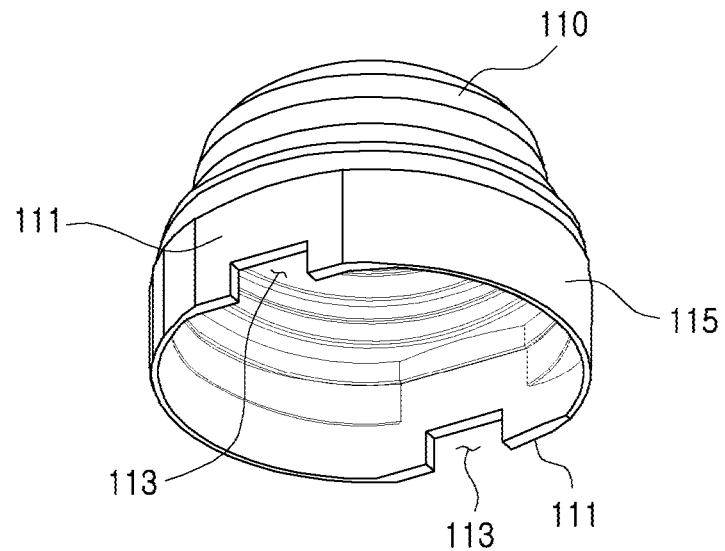
FIG. 5 is a bottom perspective view of a lens barrel according to one or more embodiments.
Figure 6:
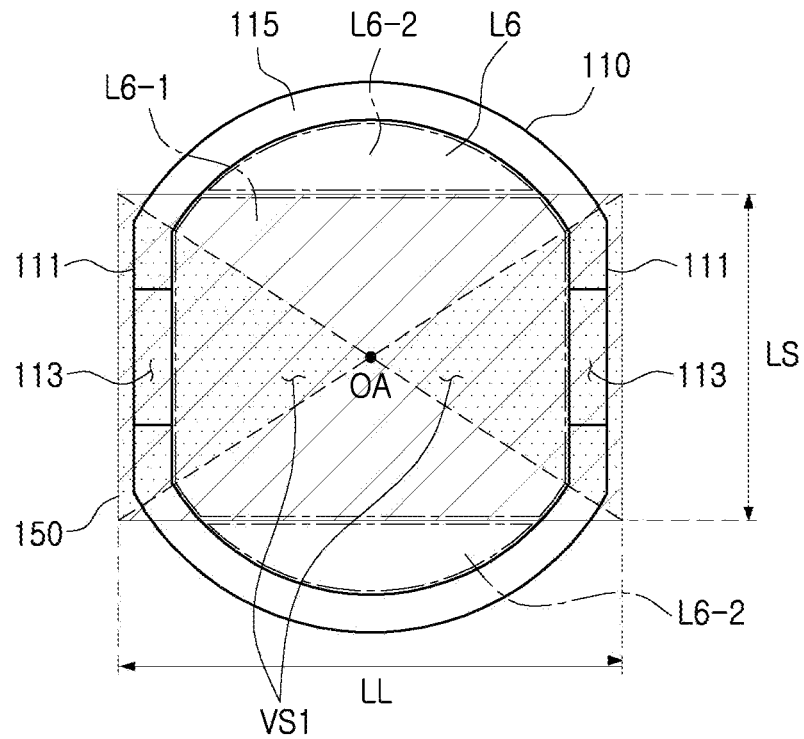
FIG. 6 is a bottom view showing an arrangement relationship of a lens barrel and an image sensor according to one or more embodiments.

Referring to FIGS. 4 through 6, a lens barrel, e.g., lens barrel 110, included in a camera module, e.g., the camera module 100, may have a D-cut at an end of the image side direction, and thus one or more lenses fitted in the lens barrel 110 may be D-cut lenses. In an example, a plurality of lenses are provided in the example lens barrel 110. For convenience of description an example in which a total of six lenses are provided in the lens barrel 110 will be described as an example, i.e., hereinafter referred to as 'a first lens', 'a second lens' . . . , etc. in order from the object side to the image side, noting that example spacers are also referred to in the same first, second, . . . , etc. order from the object side to the image side. Here, though the example of a total of six lenses will be discussed, it is noted examples are not limited thereto, as there may be total of less than six lenses and a total greater than six lenses, in various examples.

Thus, in the example in which six lenses are provided in the lens barrel 110, an example four lenses L1 to L4 on the object side are circular lenses, and an example two lenses L5 to L6 on the image side are each D-cut lenses including straight line portions L5-3 or L6-3 on their respective rims. Spacers S1 to S5 may be provided between adjacent similarly referenced lenses, e.g., with spacer S1 being provided between lenses L1 and L2, spacer S2 being provided between lenses L2 and L3, . . . , etc. In such an example, spacers S4 and S5 are provided with respective D-cut forms, and respectively coupled between lenses L4 and L5 and between lenses L5 and L6.

The illustrated example outer diameter D of an effective surface (a portion of the corresponding lens having optical focusing capabilities) of the lens L6, positioned last to the image side, may be larger than an inner diameter d of the spacer S5 interposed between lenses L6 and L5 (here, the outer diameter D of the effective surface of the lens L6 and the inner diameter d of the spacer S5 may be circular).

In order to maximize the optical performance of the lens, the diameter of the last lens may be maximized on the image side. However, considering that the D-cut is provided in the rim of the lens, a portion of the effective surface of the lens that is located outermost and is closest to the D-cut may help prevent light from being incident by the spacer S5 in order to reduce occurrence of a flare and ghost phenomenon.

Meanwhile, D-cut portions of the example fifth and sixth lenses L5 and L6 which are D-cut lenses are arranged corresponding to the D-cut portion 111 in the lens barrel 110, e.g., with the straight line portions L5-3 and L6-3 on the respective rims being coupled, for example, to the lens barrel 110 such that the D-cut portions are relatively positioned (e.g., arranged in parallel) with the D-cut portion 111, and accordingly one-directional diameter of the lens barrel 110 may be further reduced, e.g., reduced further compared to an example with only one D-cut lens. Here, at least a pair of the straight line portions L5-3 and L6-3 provided in the D-cut lenses L5 and L6 may be symmetrically provided with respect to the optical axis such that the straight line portions L5-3 and L6-3 correspond to the number and positions of the D-cut portions 111 provided in the lens barrel 110. Accordingly, with such a form, the lens barrel 110 may be miniaturized compared to previous approaches without such D-cut portions, and furthermore, the resultant camera module 100 may also thereby be miniaturized over previous camera modules without such D-cut portions.

The image sensor 150 mounted on the camera module 100 has a rectangular shape (hereinafter a long side forming the rectangle is referred to as a long side LL, and a short side is referred to as a short side LS), and thus the lens barrel 110 and the image sensor 150 may be relatively arranged (aligned) as shown in FIG. 6 in the direction of the optical axis. That is, the image sensor 150 may be disposed to have directionality such that the image sensor 150 is disposed relative to the straight line portions L5-3 and L6-3 of the D-cut portion 111 of the lens barrel 110 or the D-cut lenses L5 and L6 provided in the lens barrel 110.

That is, the image sensor 150 may be disposed such that the short side LS is disposed in parallel with the D-cut portion 111 of the lens barrel 110 in the housing 180. In other words, since the straight line portions L5-3 and L6-3 of the D-cut lenses L5 and L6 are mounted to be parallel to the D-cut portion 111 of the lens barrel 110, the image sensor 150 may be disposed such that the short side LS is disposed in parallel with the straight line portions L5-3 and L6-3 of the D-cut lenses L5 and L6.

Referring to FIG. 6, the lens barrel 110 and the image sensor 150 may be disposed so as to overlap each other in the direction of the optical axis, and the short side LS of the image sensor 150 may be disposed (aligned) relative to the D-cut portion 111 of the lens barrel 110 for efficiency of arrangement, for example. Accordingly, the short side LS of the image sensor 150 may be disposed with the straight line portions L5-3 and L6-3 D-cut by the fifth and sixth lenses L5 and L6. The long side LL of the image sensor 150 may be provided to cover at least a part of the sixth lens L6 across the lens barrel 110.

In this arrangement, the last lens (e.g., L6 in FIG. 4) in the direction of the image side may be divided into a portion L6-1 overlapping the image sensor 150 in the direction of the optical axis and a portion L6-2 not overlapping the image sensor 150. In the non-overlapping portion L6-2, since a predetermined distance is formed between the image sensor 150 and the inner surface of the lens barrel 110, even if the incident light is reflected from the inner surface of the lens barrel 110, such reflected light may not be finally formed on the image sensor 150, and thus the flare and ghost phenomenon may not occur much.

On the contrary, in the portion L6-1 where the last lens (e.g., L6 in FIG. 4) overlaps the image sensor 150 in the direction of the optical axis, since there is no gap between the inner surface of the image sensor 150 and the lens barrel 110, if the incident light were reflected from the inner surface of the lens barrel 110 without an example one or more notches discussed herein it may be directly formed on the image sensor 150, and thus the possibility of occurrence of the flare and ghost phenomenon may be relatively high.

Therefore, in an example, the lens barrel 110 having the D-cut portion 111 according to an example may further include such one or more notches, such as through groove 113, at the end of the direction of the image side so as to reduce reflection of the incident light with respect to the portion where the D-cut portion 111 is formed back onto the image sensor 150. For example, the illustrated through groove 113 may be provided in the portion where the D-cut portion 111 of the lens barrel 110 is formed in which there is relatively no gap between the image sensor 150 and the inner surface of the lens barrel 110.

In other words, the example through groove 113 may be provided relative to a virtual space VS1 formed by an extension line connecting an optical axis OA and the straight line portion L6-3 of the D-cut lens L6 or both ends of the short side LS of the image sensor 150 at the shortest distance (such as illustrated in FIG. 6).

Accordingly, incident light, which may have reflected off the lens barrel 110, may be emitted to the outside through the through groove 113 of the lens barrel 110, and thus the flare and ghost phenomenon may be reduced since no image may be formed from reflected light incident on the image sensor 150.

Here, the example through-groove 113 may be provided between the image sensor 150 and the D-cut lens that is most biased toward the image side in the direction of the optical axis, e.g., a last lens of the lens barrel 110.

Figure 7A:
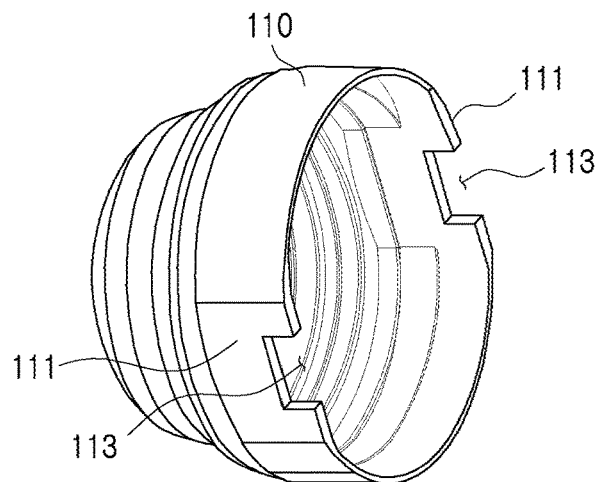
FIGS. 7A, 7B and 7C show various shape examples of a lens barrel according to various embodiments.
Figure 7B:
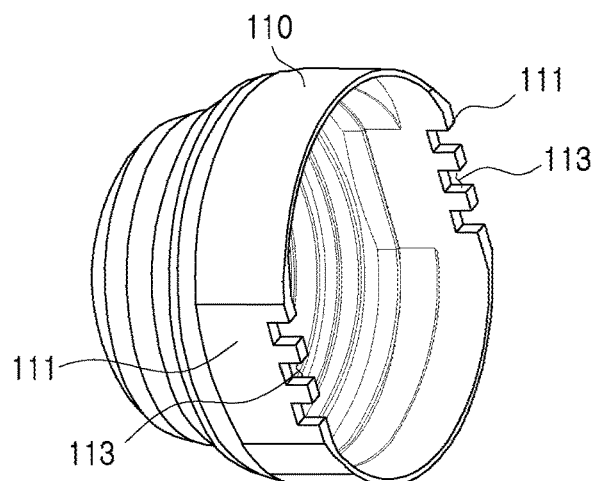
Figure 7C:
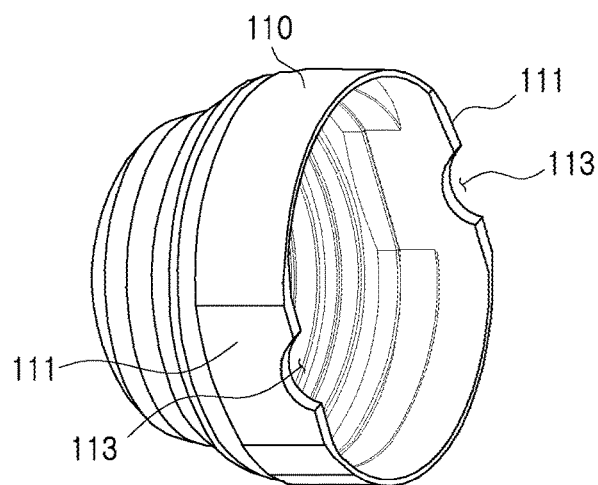

Meanwhile, referring to FIG. 7, each of the example notches, such as the through grooves 113, provided in the lens barrel 110 may have various shapes such as a rectangle or a square (FIG. 7A) on both sides and a plurality of rectangles, squares (FIG. 7B), or round shapes (FIG. 7C), e.g., on both sides of the lens barrel 110. Here, while an example of the notch as a rectangle or square is discussed, examples are not limited, as examples include other polygons as well, such as the shapes illustrated in FIGS. 8 through 11.

Figure 8:
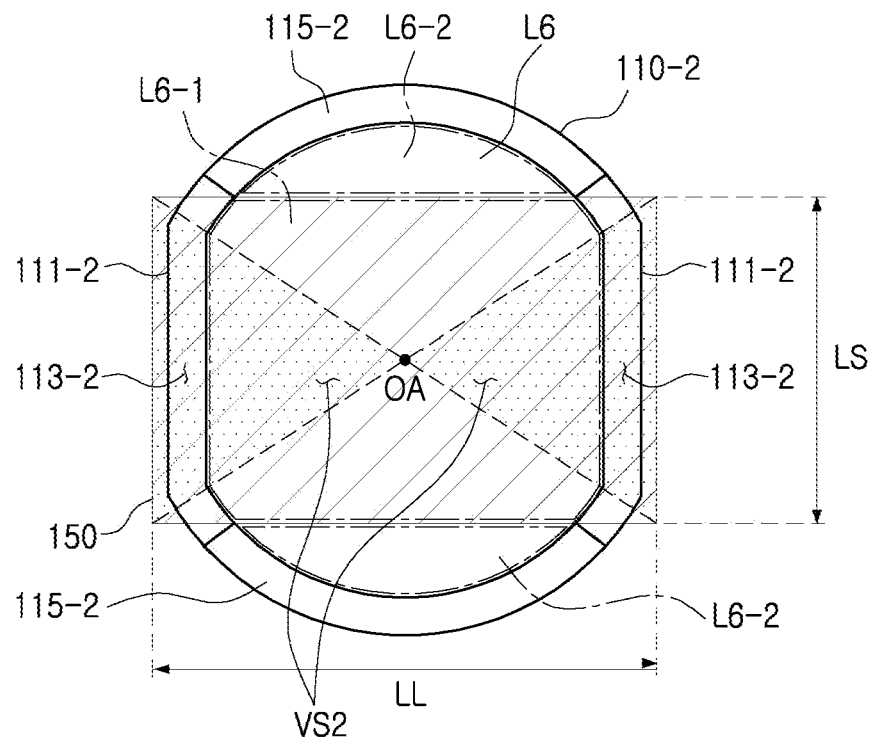
FIG. 8 is a bottom view showing an arrangement relationship between a lens barrel and an image sensor according to one or more embodiments.
Figure 9:
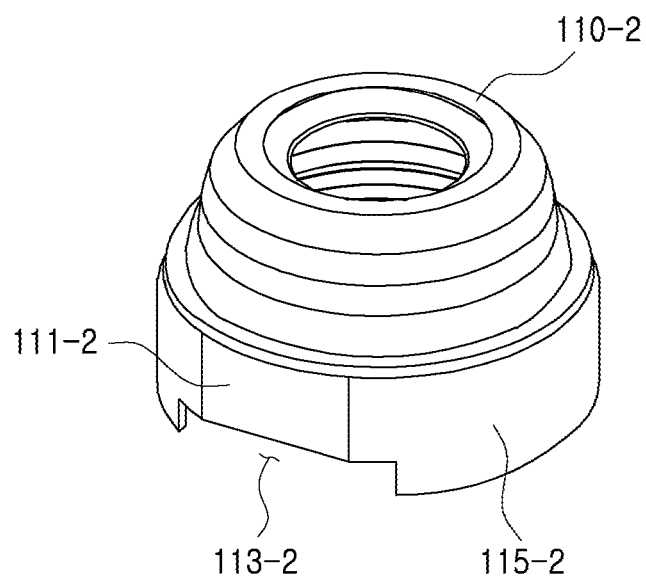
FIG. 9 is a perspective view of a lens barrel according to one or more embodiments.

FIG. 8 is a bottom view showing an arrangement relationship between a lens barrel and an image sensor, according to one or more embodiments. FIG. 9 is a perspective view of a lens barrel, according to one or more embodiments, such as the lens barrel shown in FIG. 8. Below, while FIGS. 8 and 9 will be discussed with reference to an example with the same lens barrel 110-2 and image sensor 150, this is for convenience of explanation and examples are not limited thereto.

Accordingly, referring to FIGS. 8 and 9, the lens barrel 110-2 may have the same structure as the lens barrel 110 discussed above with respect to FIGS. 1 through 7, as non-limiting examples, though differing in a shape of the notch, e.g., the illustrated through groove 113-2.

As described above, the image sensor 150 may be provided to wholly cover a portion where a D-cut 111-2 of the lens barrel 110-2 is formed in a direction of an optical axis. Accordingly, there may be no gap between the image sensor 150 and an inner surface of the lens barrel 110-2 in the portion L6-1 where the last lens (e.g., L6 in FIG. 4) overlaps the image sensor 150 in the direction of the optical axis, and without such notches described herein if incident light were reflected from the inner surface of the lens barrel 110-2 it may be directly imaged on the image sensor 150, and thus the possibility of occurrence of flare and ghost phenomenon would be relatively high.

However, since the image sensor 150 is provided to wholly cover the portion where the D-cut 111-2 of the lens barrel 110-2 is formed in the direction of the optical axis so that the incident light is imaged in the widest possible area, the image sensor 150 is disposed to partially cover a rounding portion 115-2 adjacent to the portion of the lens barrel 110-2 where the D-cut 111-2 is formed.

Therefore, the portion L6-1 in which the final lens (e.g., L6 in FIG. 4) overlaps the image sensor 150 in the direction of the optical axis accurately corresponds to the portion where the D-cut 111-2 of the lens barrel 110-2 is formed and the rounding portion 115-2 adjacent to the portion. Accordingly, in addition to the portion of the lens barrel 110-2 where the D-cut 111-2 is formed, the light incident may also be reflected from an inner surface of the rounding portion 115-2.

Accordingly, in an example, the lens barrel 110-2 may have the notch shape of through-groove 113-2 that extends into the rounding portion 115-2 beyond the portion where the D-cut portion 111-2 is formed. More specifically, the through-groove 113-2 may be formed to a whole part where the D-cut 111-2 is formed in the circumferential direction and a part of both the rounding portions 115-2.

In other words, the through groove 113-2 may be provided over both inner and outer portions of a virtual space VS2 formed by an extension line connecting the optical axis OA and the straight line portion L6-3 of the D-cut lens L6 or both ends of the short side LS of the image sensor 150 at the shortest distance.

The through groove 113-2 may be provided so that the lens barrel 110-2 approximately coincides with a boundary overlapping with the image sensor 150 in the direction of the optical axis or extends to the outside beyond the boundary or extends only to the inside without exceeding the boundary.

Accordingly, the incident light may exit to the outside more accurately through the through groove 113-2 of the lens barrel 110-2, and thus, no image may be formed on the image sensor 150 from such reflected light, thereby reducing a flare and ghost phenomenon.

Figure 10:
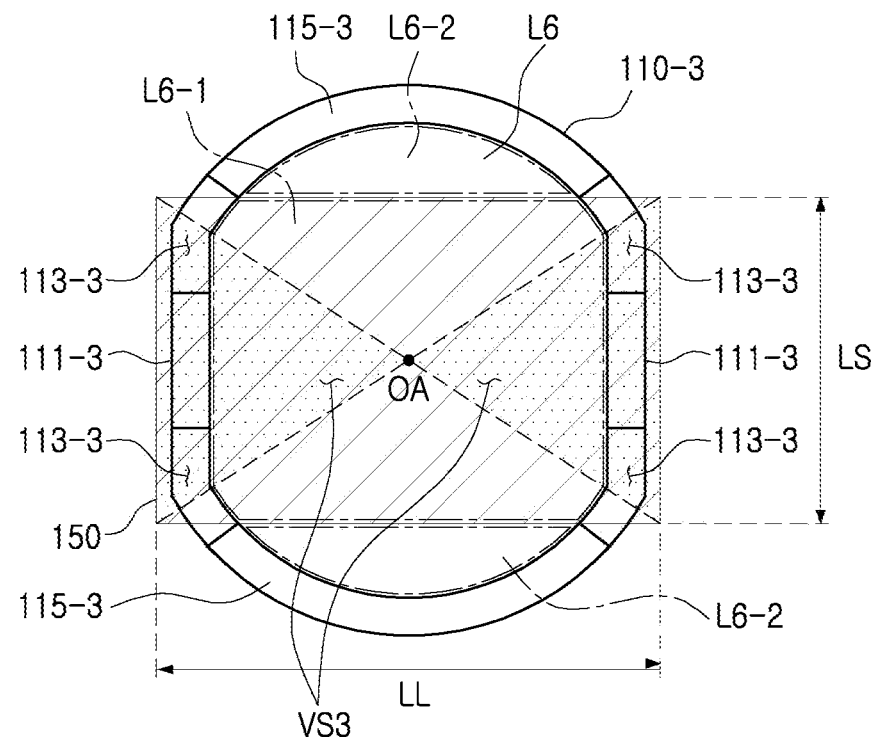
FIG. 10 is a bottom view showing an arrangement relationship of a lens barrel and an image sensor according to one or more embodiments.
Figure 11:
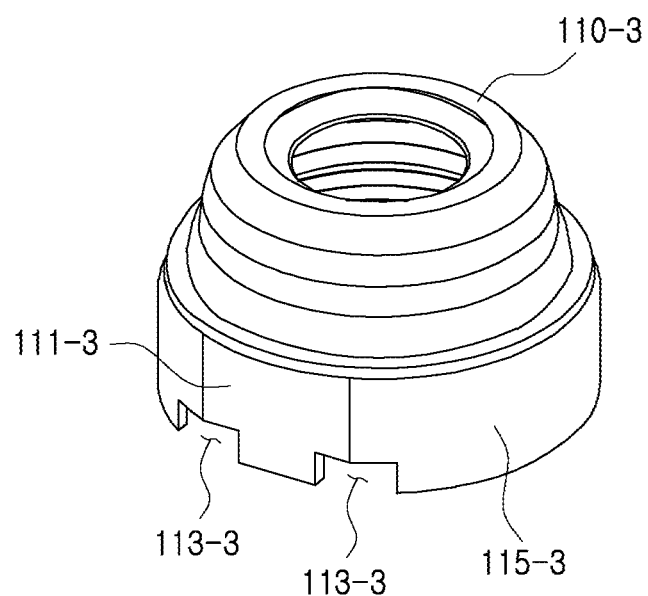
FIG. 11 is a perspective view of a lens barrel according to one or more embodiments.

FIG. 10 is a bottom view showing an arrangement relationship of a lens barrel and an image sensor, according to one or more embodiments. FIG. 11 is a perspective view of a lens barrel, according to one or more embodiments, such as the lens barrel shown in FIG. 10. Below, while FIGS. 10 and 11 will be discussed with reference to an example with the same lens barrel 110-3 and image sensor 150, this is for convenience of explanation and examples are not limited thereto.

Accordingly, referring to FIGS. 10 and 11, the lens barrel 110-3 may have the same configuration as the lens barrel 110 discussed above with respect to FIGS. 1 through 7, though differing in a shape of the notch, e.g., the illustrated through groove 113-3.

As described above, the image sensor 150 may be provided to wholly cover a portion where a D-cut 111-3 of the lens barrel 110-3 is formed in a direction of an optical axis. Accordingly, there may be no gap between the image sensor 150 and an inner surface of the lens barrel 110-3 in the portion L6-1 where the last lens (e.g., L6 in FIG. 4) overlaps the image sensor 150 in the direction of the optical axis. Thus, in examples with this configuration and without such a notch described herein, if incident light were reflected from the inner surface of the lens barrel 110-3, it may be directly imaged on the image sensor 150, and thus the possibility of occurrence of flare and ghost phenomenon may be relatively high.

However, since the image sensor 150 is provided to wholly cover the portion where the D-cut 111-3 of the lens barrel 110-3 is formed in the direction of the optical axis so that the incident light is imaged in the widest possible area, the image sensor 150 is disposed to partially cover a rounding portion 115-3 adjacent to the portion of the lens barrel 110-3 where the D-cut 111-3 is formed.

In other words, the through groove 113-3 may be provided over both inner and outer portions of a virtual space VS3 formed by an extension line connecting the optical axis OA and the straight line portion L6-3 of the D-cut lens L6 or both ends of the short side LS of the image sensor 150 at the shortest distance.

Therefore, the portion L6-1 in which the final lens (e.g., L6 in FIG. 4) overlaps the image sensor 150 in the direction of the optical axis accurately corresponds to the portion where the D-cut 111-3 of the lens barrel 110-3 is formed and the rounding portion 115-3 adjacent to the portion. Accordingly, in addition to the portion of the lens barrel 110-3 where the D-cut 111-3 is formed, the light incident may also be reflected from an inner surface of the rounding portion 115-3.

Accordingly, in an example, the lens barrel 110-3 may have notch shapes of the through-grooves 113-3 into the rounding portion 115-3 beyond the portion where the D-cut portion 111-3 is formed. More specifically, the through-grooves 113-3 may be formed by a portion where the D-cut 111-3 is formed in the circumferential direction and a portion of the rounding portions 115-3. The through groove 113-3 may be provided so that the lens barrel 110-3 approximately coincides with a boundary overlapping with the image sensor 150 in the direction of the optical axis in a part of the portion where the D-cut portion 111-3 is formed or extends to the outside beyond the boundary or extends only to the inside without exceeding the boundary.

Accordingly, the incident light may exit to the outside more accurately through the through groove 113-3 of the lens barrel 110-3, and thus, no image may be formed on the image sensor 150 from such aforementioned reflected light, thereby reducing the potential for the flare and ghost phenomenon in the captured image. Furthermore, since the example through-groove 113-3 may not be formed in the whole part of the D-cut 111-3, a rigidity of the lens barrel 110-3 may be maintained or not substantially compromised.

Figure 12A:
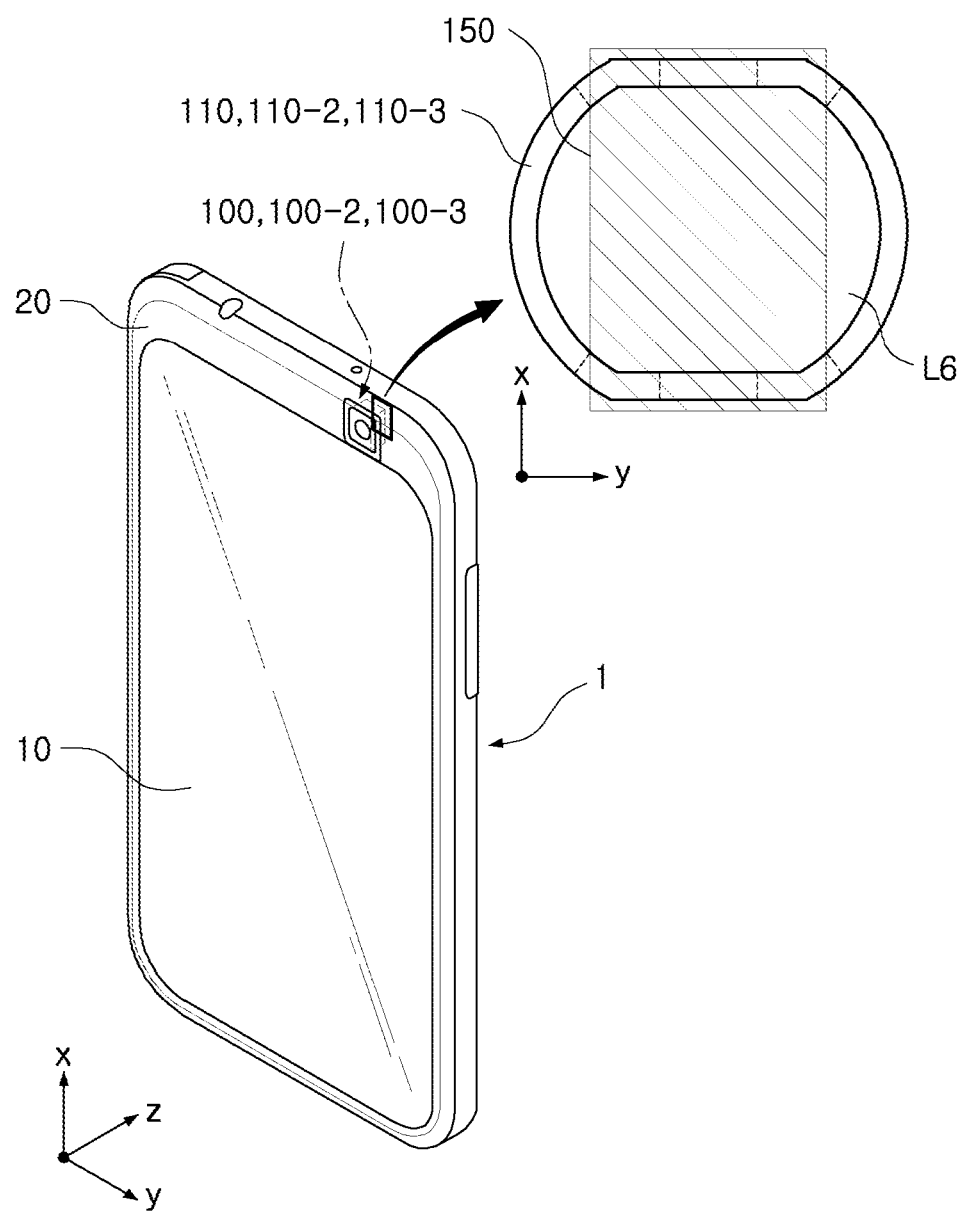
FIGS. 12A and 12B are perspective views of a mobile device with camera modules according to various embodiments.
Figure 12B:
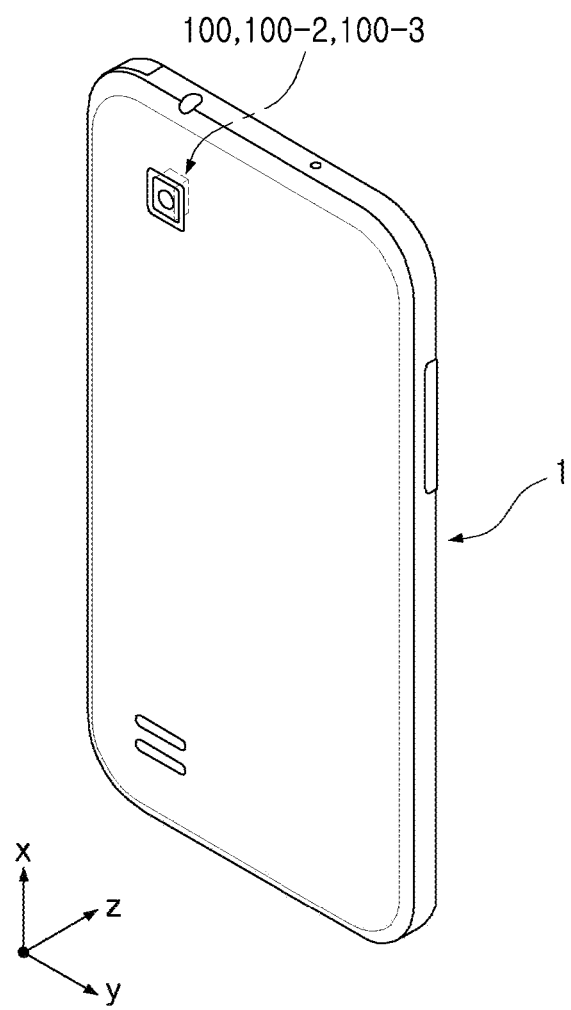

FIGS. 12A and 12B are perspective views of a mobile device 1 including one or more camera modules, e.g., one or more or any combination of the aforementioned camera modules 100, 100-2, and 100-3, noting that examples are not limited thereto.

FIG. 12A shows a case where such example camera modules 100, 100-2, and 100-3 may be respectively be used as front cameras of the mobile device 1. In various examples the example camera modules 100, 100-2, and 100-3 of FIG. 12A are installed in various arrangements to variously utilize the space of the mobile device 1. In addition, as noted, though references are made to a camera module, the camera module illustrated in FIG. 12A is representative of one or multiple cameras having the same or different configurations according to the example camera modules 100, 100-2, and 100-3, noting that examples are not limited thereto.

Meanwhile, the short side LS of the image sensor 150 may be disposed with a short side of the mobile device 1. According to such arrangement, and as a non-limiting example, any respective one or any combination of the camera modules 100, 100-2, and 100-3, as well as multiples of any of such respective camera modules, may be efficiently arranged in a bezel 20 (for example, an upper portion of a display 10 in which a front camera is installed) provided as a small space around the display 10 of the mobile device 1 by using a structure in which widths (a direction in perpendicular to a direction of an optical axis) of the example 100, 100-2, and 100-3 camera modules are relatively small by the example D-cut portions 111, 111-2, and 111-3 of the example lens barrels 110, 110-2, and 110-3, and thus the space of the mobile device 1 may be efficiently utilized to a great or maximum extent.

FIG. 12B shows a case where such example camera modules 100, 100-2, and 100-3 may be respectively be used, e.g., in addition to the camera modules of FIG. 12A or alternatively to camera modules of FIG. 12A, as rear cameras of the mobile device 1. In various examples, any respective one or any combination of the example camera modules 100, 100-2, and 100-3 of FIG. 12B, as well as multiples of any of such respective camera modules, are installed in various arrangements to variously utilize the space of the mobile device 1. Thus, similar to above, though references are made to a camera module, the camera module illustrated in FIG. 12B is representative of one or multiple cameras having the same or different configurations according to the example camera modules 100, 100-2, and 100-3, noting that examples are not limited thereto.

As set forth above, one or more examples may provide a mobile device and lens module in which a flare and ghost phenomenon are reduced by lessening or minimizing the external form change and improving or optimizing the arrangement of simple components.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed:

1. A lens module comprising:
a lens barrel; and
a plurality of lenses sequentially stacked from an object side to an image side in the lens barrel,
wherein the plurality of lenses includes one or more D-cut lenses having respective straight line rim portions,
wherein a straight line portion of a D-cut lens, of the one or more D-cut lenses, overlaps an image sensor for imaging light passing through the plurality of lenses, and
wherein the image sensor has a rectangular shape having a long side and a short side, and the short side is disposed in parallel with the straight line portion of the D-cut lens.

2. The lens module of claim 1, wherein the D-cut lens is disposed closest, among the plurality of lenses, to the image sensor.

3. The lens module of claim 1, wherein the D-cut lens comprises a pair of straight line portions on symmetrically opposing sides of the D-cut lens with respect to an optical axis of the plurality of lenses.

4. The lens module of claim 1, wherein the lens barrel comprises notches, including a notch penetrating through inside and outside of the lens barrel at an end of the image side of the lens barrel.

5. The lens module of claim 4, further comprising the image sensor.

6. The lens module of claim 4, wherein the notch is provided over both inner and outer portions of a virtual space formed by an extension line connecting an optical axis of the plurality of lenses and the straight line portion of the D-cut lens or both ends of the short side of the image sensor with a shortest distance.

7. The lens module of claim 6, further comprising the image sensor.

8. The lens module of claim 4, wherein the notch is provided inside a virtual space formed by an extension line connecting an optical axis of the plurality of lenses and the straight line portion of the D-cut lens or both ends of the short side of the image sensor with a shortest distance.

9. The lens module of claim 8, further comprising the image sensor.

10. The lens module of claim 4, wherein the notch is formed to have an angular shape or a round shape.

11. The lens module of claim 4, wherein the notches are respectively provided at least at straight line rim portions of one D-cut lens of the one or more D-cut lenses.

12. The lens module of claim 4, wherein the notch is provided between the D-cut lens and the image sensor in an optical axis direction of the plurality of lenses.

13. A mobile device including the lens module of claim 1 provided in a bezel region,
wherein a camera module comprising the lens module is installed in the bezel region in an upper portion of a display of the mobile device, and
wherein the straight line portion or the D-cut portion of the lens module is mounted to be parallel to a short side of the mobile device.

14. A lens module comprising:
a lens barrel; and
a plurality of lenses sequentially stacked from an object side to an image side in the lens barrel,
wherein the lens barrel comprises a D-cut portion, in a flat cut-out shape on an outer surface of an end portion of the lens barrel in a direction of the image side, and a rounding portion other than the D-cut portion,
wherein the D-cut portion of the lens barrel is configured to overlap an image sensor for imaging light passing through the plurality of lenses, and
wherein the image sensor has a rectangular shape having a long side and a short side and the short side is disposed in parallel with the D-cut portion of the lens barrel.

15. The lens module of claim 14, wherein at least one of the plurality of lenses provided in the image side comprises a straight line rim portion.

16. The lens module of claim 15, wherein the D-cut portion of the lens barrel and the straight line rim portion are arranged in parallel with each other.

17. The lens module of claim 14, wherein the lens barrel comprises notches, including a notch penetrating through inside and outside of the lens barrel at an end of the image side of the lens barrel.

18. The lens module of claim 17, wherein the notch is provided in the D-cut portion of the lens barrel.

19. The lens module of claim 17, wherein the notch is provided over both the D-cut portion and a portion of the rounding portion of the lens barrel.

20. The lens module of claim 14, wherein the lens module is a mobile device, and further comprises the image sensor and a display, wherein the lens module is installed as a front camera of the mobile device along with the display or as a back camera on a side of the mobile device other than a side with the display.

* * * * *